July 18, 1961
S. SALZMAN
2,992,455
AUTOMATIC STOCKMOLD AND CURING PRESS
Filed Nov. 14, 1958
2 Sheets-Sheet 1
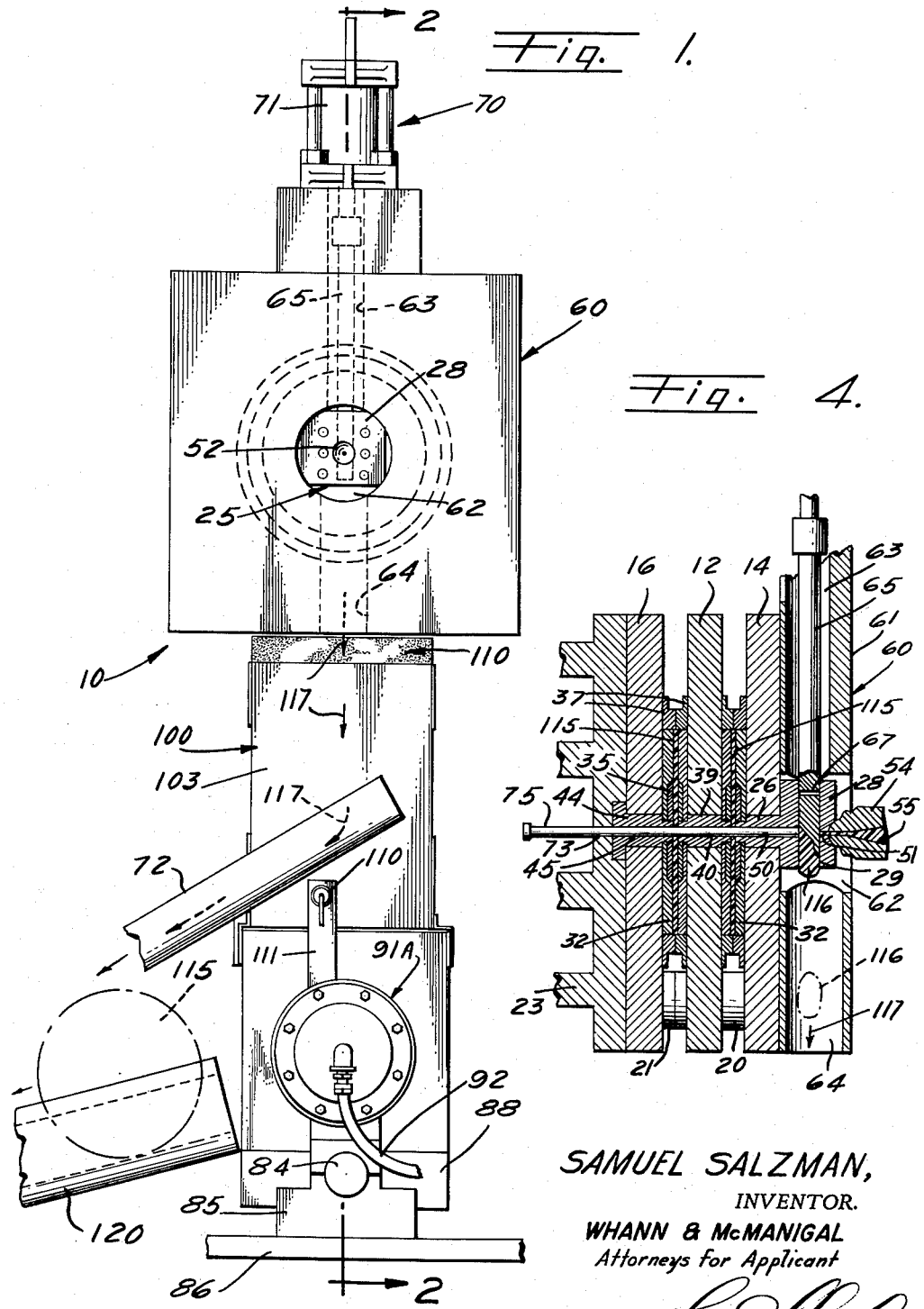
SAMUEL SALZMAN,
INVENTOR.
WHANN & McMANIGAL
Attorneys for Applicant

United States Patent Office 2,992,455
Patented July 18, 1961

2,992,455
AUTOMATIC STOCKMOLD AND CURING PRESS
Samuel Salzman, North Hollywood, Calif., assignor to Allied Record Manufacturing Company, Hollywood, Calif., a corporation of California
Filed Nov. 14, 1958, Ser. No. 773,963
4 Claims. (Cl. 18—5.3)

This invention relates generally to plastic molding apparatus and methods and relates more particularly to apparatus and methods for producing molded plastic phonograph records and the like.

While the invention has particular utility in the production of disc phonograph records, and is shown and described in such connection, it is to be understood that its utility is not confined thereto.

It is an object of the present invention to provide improved apparatus and methods for mass producing disc phonograph records at high speed.

It is another object of the present invention to provide plastic injection holding apparatus and method wherein sprue removed by the punching of the central hole in the record disc is discharged into a receptacle so that the material in the discharge nozzle is undisturbed by said sprue and remains at the normal temperature and fluid conditions for immediate discharge into the mold to form the next record after a record has been punched and discharged from the mold.

Another object of the invention is to provide apparatus of this character wherein the molded record disc moves directly from the mold when released therefrom and into a curing press.

Still another object of the invention is to provide apparatus of this character which will increase speed of producing disc phonograph records.

A further object of the invention is to provide an appartus and method for producing disc phonograph records at relatively low cost.

Another object of the invention is to provide apparatus of this character that is relatively simple in construction and operation.

The characteristics and advantages of the invention are further sufficiently referred to in connection with the following detailed description of the accompanying drawings which represent one embodiment. After considering this example, skilled persons will understand that many variations may be made without departing from the principles disclosed, and I contemplate the employment of any structures, arrangements, or modes of operation that are properly within the scope of the appended claims.

Referring to the drawings, which are for illustrative purposes only:

FIG. 1 is a side elevation of injection molding apparatus embodying the present invention;

FIG. 2 is a sectional view taken on line 2—2 of FIG. 1 of the stockmold showing the dies in the open position;

FIG. 3 is a similar view showing the dies in the closed position during the material injection phase of operation; and FIG. 4 is a similar view showing the record discs centrally punched and the sprue material resulting from the punching operation just before said material is discharged from the apparatus.

Referring more particularly to the drawings, there is shown molding apparatus, indicated generally at 10, which includes a center mold plate 12 and outer mold plates 14 and 16 at opposite sides of said center mold plate. The outer mold plates 14 and 16 are spaced laterally from the respective sides of the center mold plate. There is a leader pin 18 having one end fixed in the end plate 14 adjacent the bottom thereof and extending laterally therefrom. The center mold plate 12 is provided with a bearing 20 slidable on the leader pin 18 and the outer mold plate 16 is provided with a bearing 21 which is also slidable on the leader pin 18. The outer mold plate 14 is fixed while the center mold plate and the outer mold plate 16 are movable in the well-known manner, the outer mold plate 16 being connected to die head 23 which, in turn, is connected to the usual hydraulic actuator mechanism, not shown.

The mold plate 14 is provided with an inlet bushing, indicated generally at 25, and including a part 26 fixed in the usual manner in an opening 27 centrally located in said mold plate 14 and extending therethrough. At the outer end of the inlet bushing there is a transverse boss 28 having a longitudinally extending vertical bore 29 therethrough. The boss 28 is snugly received against the outlet side of the mold plate 14 and the inner end of said inlet bushing is provided with a reduced diameter portion 30 which projects inwardly of the inner face of said mold plate 14.

On the reduced diameter portion 30 of said inlet bushing, there is disposed, in the usual manner, a stamper 32 which has a central, annular recess 33 in the inner side thereof. A center clamping ring 35 is disposed in said recess 33 and is fixed on the inner end portion of the reduced diameter part 30 of the inlet bushing. The stamper 32 is provided on its inner face with the usual sound track groove and on the periphery of said stamper there is secured a clamping ring 37 which is of somewhat greater thickness than the thickness of the stamper 32 and the stamping ring 35.

The center mold plate is also provided with a central opening 38 therethrough in which is fixed a center bushing 39 having an axial or longitudinally extending passage 40 therethrough. At each end of the center bushing there is a longitudinally extending reduced diameter part 41. There is a stamper 32 at each side of the mold plate 12 and these stampers are of the same construction as the stamper 32 previously described. The stampers 32 for the center mold plate 12 are fixed on the respective reduced diameter portions 41 of the center bushing and each of said stampers 32 is provided with the annular recess in the outer side in which is disposed a center clamping ring 35 of the same construction as the center clamping ring already described. A clamping ring 37 is also provided on the periphery of the stampers 32 at the sides of the mold plate 12.

Mold plate 16 has an opening 43 therethrough for reception of an end bushing 44, said opening 43 being axially aligned with the openings 38 and 27. The bushing 44 is provided with an axially extending opening 45 therethrough and has an annular flange 46 at the outer end which is received in a recess provided therefor in the adjacent face of the die head 23 to which said outer mold plate 16 is secured. The inner end of the end bushing 44 is provided with a reduced diameter portion 48 on which is disposed a center clamping ring having an annular central recess 33 therein in which is received center clamping ring 30. The stamper is also provided with a peripherally attached clamping ring 37.

The inlet bushing 28 is provided with a longitudinally extending passage 50 inwardly of the bore 29. The passage 50 extends from said bore 29 to the inner end of said inlet bushing. Outwardly of the bore 29, and in axial alignment with the passage 50, there is a reduced diameter passage 51 which terminates at its outer end in a concave recess 52 in which is tightly received, in the usual manner, the discharge end of a nozzle 54 which has a passage 55 therein which terminates at the outer end in a reduced diameter passage which is of substantially the same size as the passage 51 in the inlet bushing and which communicates therewith. The nozzle 54 is connected in the usual manner to the injection system of the injection molding machine, said system not being shown since it does not constitute a part of this invention.

At the outer side of the mold plate 14 there is disposed a control mechanism, indicated generally at 60, which includes a casing 61 at the outer side of the outer mold plate 14. The casing has a central opening 62 in which the boss 28 is received, and upper and lower vertically aligned passageways 63 and 64 respectively, above and below said central opening 62 and communicating therewith. Within the passageway 63 is a control rod 65, the lower end of which is slidable in the bore 29 of said boss 28. The lower end of the rod 65 is cut away, as at 66, on the side adjacent the passage 50 and above the cut away end portion 65 there is a transverse passage 67 of substantially the same size as the reduced diameter part of passage 55 of the nozzle. The control rod 65 is movable between a lower position whereat the cross bore 67 is in alignment with the inlet bushing passage 51 and the passage 50 of said inlet bushing, as shown in FIG. 3, and an upper position whereat the cross passage or bore 67 is out of such alignment and the lower cut away end portion 66 of said rod 65 is in communication with the passage 50 of said inlet bushing and the passage portion 51 of the bushing is closed by said rod, as shown in FIG. 4. Thus rod 65 is, in effect, a slide valve which opens the injection system into the molds and closes it from the molds. When rod 65 closes the injection system from the molds, it simultaneously vents the molds to the atmosphere.

Actuation of control rod 65 is effected by a hydraulic actuator, indicated generally at 70, which is fixed to the upper end of the housing 61. Actuator 70 may be of any well-known type having a hydraulic pressure cylinder 71 and a piston 71a connected to the upper end of the rod 65 and operably disposed in said cylinder, said cylinder being supplied with pressure fluid by supply conduits 71b and 71c.

Below the lower end of the passageway 64 is a salvage material chute 72.

Aligned with the opening 45 in the end bushing 44 is an opening 73 in the die head 23. An ejector pin 75 is slidably disposed in the openings 73 and 45, the latter being in the end bushing 44. The pin is also slidable into and out of the passages 40 and 50 of the respective center and inlet bushings. Actuation of the plunger is effected by a hydraulic actuator 77 which may be of any suitable well-known type having a piston 78 in a cylinder 79, said piston having a piston rod 80 connected to said ejector pin 75. The actuator 77 is carried by and movable with the die head 23 and said cylinder 79 is supplied with pressure fluid by means of a supply conduit 81 connected to one end and a supply conduit 81b connected to the other end.

Directly below the stockmold is a press into which records formed by the stockmold are dropped for additional curing. This press is of known character and operation so will be but briefly described.

There is a central curing plate 81' and outer curing plates 82 and 83 at the respective sides of the central plate 81'. The plates are carried by a shaft 84 having its ends secured in support block 85 attached by any suitable well-known manner to a base 86.

At the inner sides of the blocks 85 and secured to the shaft 84 are support members 88, the curing plates being operably disposed between said support members.

At the outer side of each support member there is an adaptor plate 89, each of said plates being secured to the adjacent support member by means of a bracket 90. At the outer side of each adaptor plate there is operably mounted an actuator, said actuator being indicated generally at 91A and 91B respectively. Said actuators are connected with a source of pressure fluid by means of conduits 92 and 93 respectively and there is the usual control means for said pressure fluid to actuate said actuators in timed relationship with other parts of the apparatus. The actuators are connected with respective plates 82 and 83 with connecting means 95.

Attached to the outer sides of the plates 82 and 83, are solenoids 96 having electrical connections 97 with a suitable source of electric current, the supply of current to said solenoids being controlled by the well-known timing mechanism so that the solenoids will be actuated at predetermined times as will be described more particularly hereinafter.

Just above the plates 81', 82 and 83 are a pair of record guides, indicated generally at 100. These guides are formed of any suitable sheet material and comprise a central member indicated generally at 101 and formed in the shape of an inverted V, the side parts 102 thereof diverging downwardly from the apex at the upper end. At each side of the central member there is a side member 103 which define, with the central member, a pair of passages 104 which are smaller at the lower end than at the upper end. The lower ends of said passages 104 are open and are disposed in alignment with the space between the central plate 81' and the side plates 82 and 83 respectively. The flaring upper ends of said passages 104 are disposed so as to receive records which have been formed by the stockmold and released therefrom.

The parts 101 and 103 are provided with felt facings 106 so that records dropped into the passageways 104 will be protected against scratching or other damage.

The guide parts 101 and 103 also have aligned openings 108 therein. A light, 109, is disposed within the V of the guide part 100 adjacent the openings therein to provide illumination through said openings 108. At each side of the members 103 there is a photo-electric cell 110 secured in a support member 111 extending upwardly from the support members 88 respectively. The photo-electric cells 110 are suitably connected to electrical control equipment of well-known character so that the curing press will be operated in the well-known manner, said photo-electric cells being aligned with the openings 108.

Referring to the stockmold, the stampers 32 are provided with the soundtrack grooves of well-known character and as said stampers are somewhat thinner than the clamping rings 37, there is a space between adjacent stampers when the mold plates are closed, said space comprising a mold cavity in which is injected suitable plastic material to form records 115.

In FIG. 2 the mold plates are shown in the open position with the ejector pin 75 in its withdrawn position and the control rod 65 in its upper position cutting off communication between the nozzle 54 and the passage 51 of the inlet bushing. The actuator 70 is supplied with pressure fluid by suitable well-known control means, pressure fluid being supplied to the underside of the piston 71a through the conduit 71c to effect positioning of said control rod in its upper position such as shown in FIG. 2.

In FIG. 3 the mold plates are in the closed position and the control rod 65 has been moved to its lower position by the application of pressure fluid to the upper side of piston 71a through the conduit 71b. When the control rod 65 is in said lowermost position, FIG. 3, the cross bore 67 is aligned with the outlet of the nozzle 54 and the passage 50. The usual timing and control mechanism for injection of plastic into the mold through the nozzle 54 is actuated and such plastic, which is in the usual well-known fluid condition for injection, is injected through the passages 50 and 40 of the inlet and center bushings respectively and thence into the mold cavities between the stampers. It is to be noted that when the stockmold is closed, the adjacent ends of the bushings are spaced apart so that plastic injected into said passages 50 and 40 will flow into the mold cavities defined by the stampers between the center mold plate 12 and outer mold plate 14 and the center mold plate 12 and the outer plate 16.

Pressure fluid in then applied to the underside of the piston 71a to raise the control rod 65 to its uppermost position, shown in FIG. 4, whereat the cross bore 67 is out of alignment with the passage 51 and the passage 50 so that no plastic can be discharged from the nozzle 54. The upper end of the cutaway end portion 66 of the control rod is above the passage 50 of the inlet bushing and at this time the actuator 77 is supplied with fluid pressure against the piston 78 to effect inward movement of the ejector pin through the records 115 and passages 40 and 50 of the center and inlet bushings respectively, said ejector pin being moved to the position shown in FIG. 4 whereat the inner end of said pin is flush with the adjacent wall of the bore 29. As the pin 75 is forced inwardly, the center holes are punched in the records and the sprue material in the passages 40 and 50 of the center and inlet bushings is forced into the space defined by the cutaway lower end portion 66 of the control rod and the adjacent portions of the bore 29, said sprue material then dropping downwardly in a lump 116 through the passage 64 and thence into the chute 72 which conveys same to any suitable receptacle, the path followed by said ejected sprue material being indicated by the arrows 117.

By thus disposing of the excess material, instead of forcing it back into the nozzle 54, the mechanism is ready for the next cycle of injecting plastic into the mold cavities without any problem of reheating or conditioning the excess sprue material such as would occur if said material were forced back into the nozzle.

After ejection of the excess sprue material, the ejector pin is moved back to the normal rest position shown in FIG. 2 by the application of pressure fluid to the opposite side of the piston 78 through the conduit 81. Also, the usual actuating mechanism for opening the stockmold, separating the mold plates, is set in operation and the mold plates are moved to the open position as shown in FIG. 2. The records are forced from the mold cavities by air in the usual well-known manner. This part of the mechanism is not part of the present invention and is not shown but its arrangement and operation is well-known.

Records discharged from the stockmold drop into the record guide passages 104 and downwardly into the spaces between the curing plates 81', 82 and 83, said plates being maintained in the normal open position shown in FIG. 2. At this time, the solenoids 96 are energized and the inner ends of their armatures, not shown, are provided with pins 119 which extend through openings provided therefor in the respective outer plates 82 and 83. These pins are adjacent one edge of the plates 82 and 83 and when the records drop into the spaces between said plates, said pins prevent said records from rolling therefrom. When the records drop through the passages 104 they interrupt the light from the electric light 109 to the photo-electric cells 110 to cause actuation of the control mechanism controlling the supply of pressure fluid to the actuators 91A and 91B and causing the plates 82 and 83 to be moved inwardly to clamp the records that have just dropped into the spaces therebetween against the center plate 81'. It is to be noted that the plates 82 and 83 will not be actuated inwardly unless both records have dropped through the passages 104 and into the curing press. The control of the cycling operation is such that the curing press will open before the stockmold is ready to drop the next records formed therein into said curing press. Also, the pins 119 are withdrawn as soon as the plates 82 and 83 are moved to the open position so that records that have been clamped between the curing press plates may roll therefrom and into a chute 120 to be conveyed to a stacking station where the records are handled in the usual well-known manner.

The above sequence of operation of the mechanism is repeated as long as desired.

It is thought that the invention and many of its attendant advantages will be understood from the foregoing descripion and it is thought that it will be apparent that various changes may be made in the form, construction and arrangement of the parts of the mechanism and the method without departing from the spirit and scope thereof or sacrificing all of the material advantages, the embodiment hereinbefore described being merely for purposes of illustration.

I claim:

1. In plastic injection molding apparatus: a fixed outer mold plate; a center mold plate at one side of said fixed mold plate; a second outer mold plate at the side of the center mold plate opposite the fixed mold plate; means operably supporting the center mold plate and the second outer mold plate for movement toward and away from the fixed mold plate and from each other; an inlet bushing secured in an opening provided therefor in the fixed mold plate, said bushing having a vertical passage therethrough, an inner horizontal axial passage and an outer horizontal passage axially arranged relative to the inner axial passage at the opposite side of said vertical passage extending inwardly from said vertical passage; a die head to which the second outer mold plate is secured, said head being movable and having a passage therein in alignment with the axial passage of the end bushing; an ejector pin slidably disposed in the passages in said head and said end bushing and adapted to slide through the axial passage of the center bushing; an actuator carried by said head to move the ejector pin inwardly and outwardly in the axial passages of the end bushing and center bushings; a plastic injection nozzle operably engaging the inlet bushing and having a discharge opening connected with the outer horizontal passage therein; a control rod slidably mounted in the vertical passage in the inlet bushing, said control rod having a cross bore adapted to be moved into a position connecting the outer passage of the inlet bushing with the inner passage and to be moved to a position out of such alignment, the lower end of said control rod being inclined upwardly and inwardly; hydraulic means to move said control rod between a position whereat the crossbore thereof connects the horizontal passages of the inlet bushing during the injection of plastic into the mold cavities and a position whereat the lower end of said control rod cuts off communication between the horizontal passages of the inlet bushing and positions said lower end with the upper end of the inclined part above the upper edge of the outer end of the inner passage of the inlet bushing so that sprue forced through the axial passage of the center bushing and the inner passage of the inlet bushing will be deflected downwardly and out of the lower end of the vertical passage of said inlet bushing; and a curing press disposed directly beneath the stockmold, said curing press having clamping plates movable toward and away from each other, and record guides at the top of said press, said record guides being so positioned that records dropped from the stockmold will drop directly into the upper open ends of said guides and be guided into the curing press.

2. In plastic injection molding apparatus: a fixed outer mold plate; a center mold plate at one side of said fixed mold plate; a second outer mold plate at the side of the center mold plate opposite the fixed mold plate; means operably supporting the center mold plate and the second outer mold plate for movement toward and away from the fixed mold plate and from each other; an inlet bushing secured in an opening provided therefor in the fixed mold plate, said bushing having a vertical passage therethrough, an inner horizontal axial passage extending inwardly from said vertical passage and a relatively small outer horizontal passage axially arranged relative to the inner axial passage and at the opposite side of said vertical passage; a die head to which the second outer mold plate is secured, said head being movable and having a passage therein in alignment with the axial passage of the end bushing; an ejector pin slidably disposed in the passages in said head and said end bushing and adapted to slide through the axial passage of the center bushing; an actuator carried by said head, to move the ejector pin inwardly and outwardly in the axial passages of the end bushing and center bushings; a plastic injection nozzle operably engaging the inlet bushing and having a discharge opening connected with the relatively small horizontal passage therein; a control rod slidably mounted in the vertical passage in the inlet bushing, said control rod having a crossbore adapted to be moved into a position connecting the outer passage of the inlet bushing with the inner passage and to be moved to a position out of such alignment, the lower end of said control rod being inclined upwardly and inwardly; hydraulic means to move said control rod between a positon whereat the crossbore thereof connects the horizontal passages of the inlet bushing during the injection of plastic into the mold cavities and a position whereat the lower end of said control rod cuts off communication between the horizontal passages of the inlet bushing and positions said lower end with the upper end of the inclined part above the upper edge of the outer end of the inner passage of the inlet bushing so that sprue forced through the axial passage of the center bushing and the inner passage of the inlet bushing will be deflected downwardly and out of the lower end of the vertical passage of said inlet bushing.

3. In plastic injection molding apparatus: a stockmold including three mold plates in side by side arrangement and mounted for relative movement toward and away from each other; means carried on adjacent faces of said plates defining axially aligned record disc molds; means for effecting said relative movements of said mold plates to thereby open and close said molds, there being aligned openings through the parts constituting said stockmold, said openings being in axial alignment with the axes of said mold and connected with said molds; means connected with one end of one of said aligned openings for injecting plastic material into said openings and thence into said molds; a control member controlling the connection between said injecting means and said openings, said member being movable between two positions respectively and when said member is in one of the said positions said injection means is connected with said openings and when said member is in the other position said injection means is cut off from said openings, said control member having a free end with an inclined surface out of alignment with said one end of one of said openings when said control member is at said one position and in alignment therewith when said control member is at said other position; means for selectively actuating said member between said positions; an ejector pin slidable in said aligned opening; means operable after said molds are closed and plastic material has been injected thereinto for moving said ejector pin through said molds and openings to form an axial opening in record discs in said molds and force sprue material pushed from said records and injected into said openings into a space defined in part at least by the inclined free end of said control member when record discs have been molded and the molds are closed, said sprue material being ejected for disposal and reuse; a curing press disposed directly beneath the stockmold and having plates mounted for relative movement toward and away from each other; means for thus moving said plates; and guide means extending upwardly from said curing press for reception of records ejected and dropped from the stockmold, said guide means guiding said records into spaces between the plates of the curing press when said plates are separated.

4. In plastic injection molding apparatus: a stockmold including three mold plates in side by side arrangement and mounted for relative movement toward and away from each other; means carried on adjacent faces of said plates defining axially aligned record disc molds; means for effecting said relative movements of said mold plates to thereby open and close said molds, there being aligned openings through the parts constituting said stockmold, said openings being in axial alignment with the axes of said mold and connected with said molds; means connected with one end of one of said aligned openings for injecting plastic material into said openings and thence into said molds; a control member controlling the connection between said injecting means and said openings, said member being movable between two positions respectively and when said member is in one of the said positions said injection means is connected with said openings and when said member is in the other position said injection means is cut off from said openings, said control member having a free end with an inclined surface out of alignment with said one end of one of said openings when said control member is at said one position and in alignment therewith when said control member is at said other position; means selectively for actuating said member between said positions; an ejector pin slidable in said aligned openings; and means operable after said molds are closed and plastic material has been injected thereinto for moving said ejector pin through said molds and openings to form an axial opening in record discs in said molds and force sprue material pushed from said records and injected into said openings into a space defined in part at least by the inclined free end of said control member when record discs have been molded and the molds are closed, said sprue material being ejected for disposal and reuse.

References Cited in the file of this patent

UNITED STATES PATENTS

| | | |
|---|---|---|
| 2,279,380 | Reid | Apr. 14, 1942 |
| 2,630,601 | Schiffer et al. | Mar. 10, 1953 |
| 2,642,621 | Amo | June 23, 1953 |
| 2,698,460 | Amo | Jan. 4, 1955 |
| 2,842,798 | Paschold | July 15, 1958 |
| 2,923,031 | Collion | Feb. 2, 1960 |

FOREIGN PATENTS

| | | |
|---|---|---|
| 900,748 | Germany | Jan. 4, 1954 |

UNITED STATES PATENT OFFICE
CERTIFICATE OF CORRECTION

Patent No. 2,992,455                                                July 18, 1961

Samuel Salzman

It is hereby certified that error appears in the above numbered patent requiring correction and that the said Letters Patent should read as corrected below.

Column 2, line 16, for "outlet" read -- outer --.

Signed and sealed this 9th day of January 1962.

(SEAL)
Attest:

ERNEST W. SWIDER                                     DAVID L. LADD
Attesting Officer                                        Commissioner of Patents